(12) United States Patent
Nollenberger et al.

(10) Patent No.: US 8,186,883 B2
(45) Date of Patent: May 29, 2012

(54) COVER-BEARING ARRANGEMENT AND METHOD FOR MOUNTING AN ACTUATOR SHAFT

(75) Inventors: Frank Nollenberger, Walheim (DE); Sabrina Kugele, Weissach (DE)

(73) Assignee: GETRAG Getriebe- und Zahnradfabrik Hermann Hagenmeyer GmbH & CIE KG, Untergruppenbach (DE)

( * ) Notice: Subject to any disclaimer, the term of this patent is extended or adjusted under 35 U.S.C. 154(b) by 978 days.

(21) Appl. No.: 12/179,512

(22) Filed: Jul. 24, 2008

(65) Prior Publication Data

US 2009/0185767 A1    Jul. 23, 2009

(30) Foreign Application Priority Data

Jul. 25, 2007   (DE) .................. 10 2007 036 554

(51) Int. Cl.
  *F16C 35/02*   (2006.01)
  *F16C 33/74*   (2006.01)
(52) U.S. Cl. ......... 384/439; 384/297; 384/428; 384/477
(58) Field of Classification Search .................. 384/139, 384/297, 435, 438–439, 428, 462, 477, 489; 29/428
  See application file for complete search history.

(56) References Cited

U.S. PATENT DOCUMENTS

| | | | | |
|---|---|---|---|---|
| 2,381,823 A | * | 8/1945 | La Bour | 415/56.2 |
| 3,164,054 A | | 1/1965 | Biesecker | |
| 3,212,168 A | * | 10/1965 | Sommer | 384/908 |
| 3,749,459 A | * | 7/1973 | Matuzaki et al. | 384/473 |
| 3,921,962 A | * | 11/1975 | Feger et al. | 366/64 |
| 4,088,063 A | | 5/1978 | Sheppard | |
| 4,321,495 A | * | 3/1982 | Kennedy | 310/164 |
| 4,359,142 A | * | 11/1982 | Schultz et al. | 184/11.1 |
| 4,586,831 A | * | 5/1986 | Belanger | 384/439 |
| 4,869,130 A | * | 9/1989 | Wiecko | 254/274 |
| 4,878,677 A | * | 11/1989 | Larkins et al. | 277/511 |
| 4,881,829 A | * | 11/1989 | Koelsch | 384/448 |
| 5,735,603 A | * | 4/1998 | Kesig et al. | 366/331 |
| 5,779,005 A | * | 7/1998 | Jones et al. | 384/378 |
| 6,935,026 B2 | * | 8/2005 | Frantzen | 29/898.07 |
| 7,025,506 B2 | * | 4/2006 | Varel et al. | 384/477 |
| 2005/0032602 A1 | * | 2/2005 | Wagle et al. | 475/230 |

(Continued)

FOREIGN PATENT DOCUMENTS

DE    6 600 211 U    9/1968

(Continued)

OTHER PUBLICATIONS

Chinese Office Action; Feb. 23, 2011; Application No. 200810214736.3.

*Primary Examiner* — Marcus Charles
(74) *Attorney, Agent, or Firm* — Knobbe, Martens, Olson & Bear LLP

(57) ABSTRACT

A cover-bearing arrangement for mounting a shaft which extends into a housing in the region of a housing opening and for closing off the housing in the region of the housing opening. The arrangement comprises a sleeve section which surrounds the shaft and which can be inserted into the housing opening, and a flange section which can be fastened to the housing. A bearing for rotatably mounting the shaft is arranged in the sleeve section. The sleeve section and the flange section are produced as a single-piece component from plastic.

15 Claims, 2 Drawing Sheets

U.S. PATENT DOCUMENTS

| | | |
|---|---|---|
| 2005/0178638 A1 | 8/2005 | Kramer et al. |
| 2006/0094563 A1* | 5/2006 | Bayer et al. .................. 475/331 |

FOREIGN PATENT DOCUMENTS

| | | |
|---|---|---|
| DE | 1 400 846 B | 2/1971 |
| DE | 1 750 988 A | 5/1971 |
| DE | 74 03 591 U | 8/1975 |
| DE | 76 23 170 U | 1/1977 |
| DE | 40 35 973 A1 | 5/1992 |
| DE | 43 35 313 A1 | 4/1995 |
| DE | 102 22 718 A1 | 2/2004 |
| DE | 10 2005 032 222 A1 | 1/2007 |
| EP | 0 282 610 B1 | 3/1987 |
| EP | 1 245 848 A1 | 10/2002 |

* cited by examiner

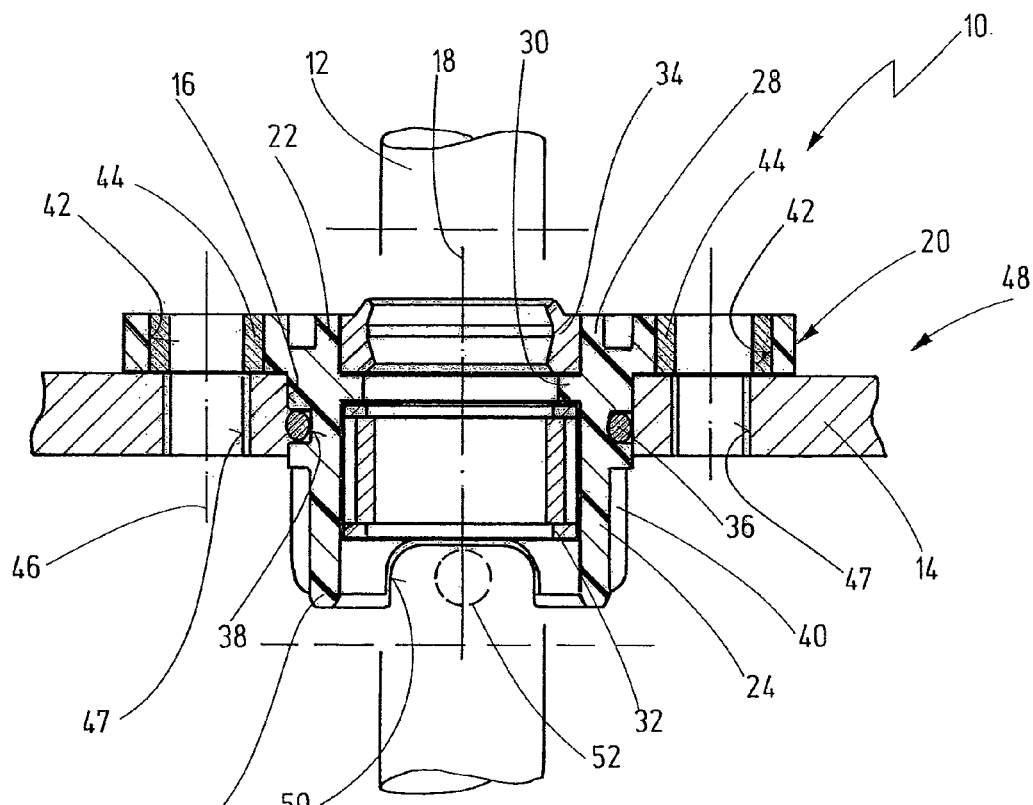
Fig.1
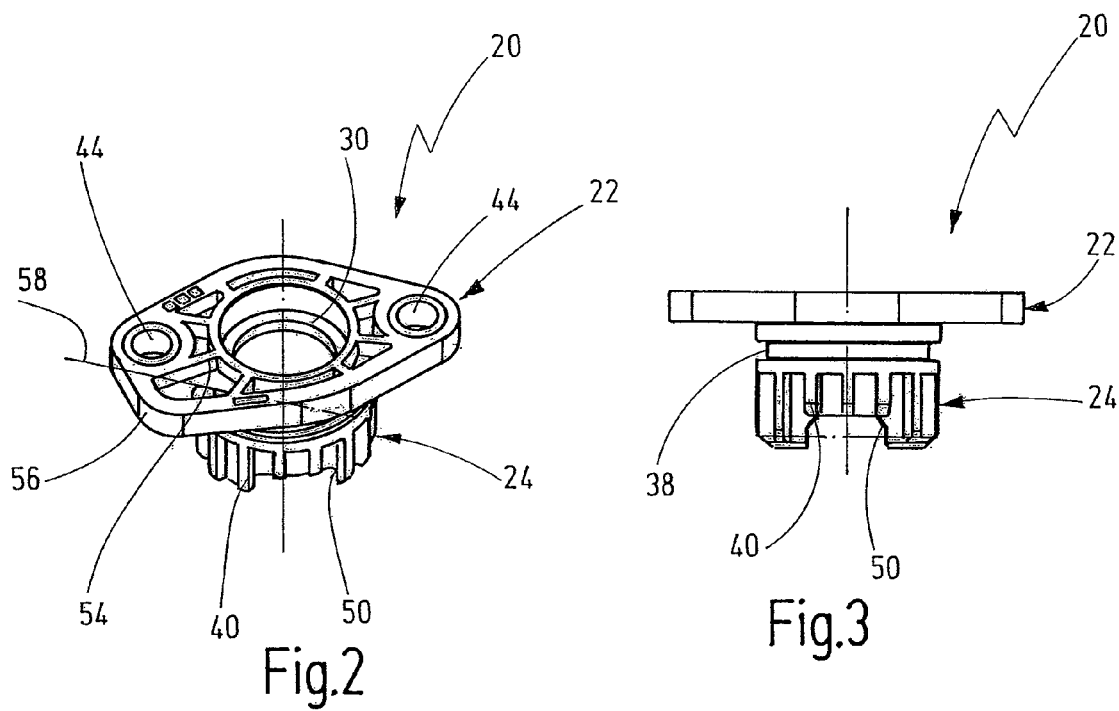
Fig.2
Fig.3

COVER-BEARING ARRANGEMENT AND METHOD FOR MOUNTING AN ACTUATOR SHAFT

CROSS-REFERENCE TO RELATED APPLICATIONS

This application claims the priority of German patent application DE 10 2007 036 554 filed Jul. 25, 2007.

BACKGROUND OF THE INVENTION

The present invention relates to a cover-bearing arrangement for mounting a shaft which extends into a housing in the region of a housing opening and for closing off the housing in the region of the housing opening, having a sleeve section which surrounds the shaft and which can be inserted into the housing opening, and having a flange section which can be fastened to the housing, with a bearing for rotatably mounting the shaft being arranged in the sleeve section.

The present invention also relates to a vehicle transmission having a housing and having an actuator shaft which extends through a housing opening into the housing, and to a method for mounting an actuator shaft in a transmission housing.

In the field of vehicle transmissions, it is known to close off a transmission housing by means of a cover which supports a bearing and if appropriate a shaft seal. A shaft is guided through the cover into the housing.

Cover-bearing arrangements of said type are known on the one hand in connection with an axle transmission, through the housing cover of which is mounted a wheel driveshaft (see for example EP 0 282 610 B1).

U.S. Pat. No. 4,088,063 also discloses a steering gear in which an input shaft is rotatably mounted on a transmission housing cover.

A similar cover-bearing arrangement for a shaft of a chain drive is known from U.S. Pat. No. 5,437,509.

BRIEF SUMMARY OF THE INVENTION

Against the above background, it is the object of the invention to specify an improved cover-bearing arrangement which is as light as possible and which, while being of comparatively low cost, can encompass a plurality of functions.

It is also an object of the invention to specify an improved vehicle transmission having a cover-bearing arrangement of said type and a method for mounting an actuator shaft in a transmission housing.

The above object is achieved by means of a cover-bearing arrangement for mounting a shaft which extends into a housing in the region of a housing opening and for closing off the housing in the region of the housing opening, having a sleeve section which surrounds the shaft and which can be inserted into the housing opening, and having a flange section which can be fastened to the housing, with a bearing for rotatably mounting the shaft being arranged in the sleeve section, with the sleeve section and the flange section being produced as a single-piece component from plastic.

As a result of the measure of providing a cover part with a sleeve section and a flange section composed of plastic, the cover-bearing arrangement can be produced in a cost-effective manner. Furthermore, weight is saved in comparison to metal components. Furthermore, a plastic part of said type can have a relatively complex shape and thereby realize a plurality of functions without a plurality of machining steps being necessary. A cover part of said type can for example be produced in an injection-moulding process.

Although the sleeve section can also be seated loosely in the housing opening, it is preferable if said sleeve section can be inserted into the housing opening with a fit. Furthermore, although it is conceivable for the flange section to be fastened to the housing from the inside, said flange section is however preferably fastened to the housing from the outside.

The above object is also achieved by means of a vehicle transmission having a housing and having an actuator shaft which extends through a housing opening into the housing, with the actuator shaft being mounted in the region of the housing opening by means of a cover-bearing arrangement according to the invention.

Also specified according to the invention is a method for mounting an actuator shaft in a transmission housing, which method has the steps:

providing the actuator shaft, which is to be mounted from within the transmission housing, by virtue of one end of the shaft being guided from the inside through a housing opening, with a cross section of the housing opening being greater than a cross section of the shaft, and with the shaft end being inserted obliquely into the housing opening at an angle of greater than zero;

mounting a cover-bearing arrangement on the shaft end, specifically outside the transmission housing;

aligning the shaft with an axis of the housing opening and inserting a sleeve section of the cover-bearing arrangement into the housing opening; and fixing the cover-bearing arrangement to the housing in such a way that the shaft end is rotatably mounted in the cover-bearing arrangement and the housing opening is sealed off.

With this aspect of the invention, it is made possible to mount shafts in a transmission housing, specifically from within the transmission housing.

It is also possible for the shaft to also be inserted initially obliquely into the housing opening, which is advantageous in particular in the event of obstruction contours being present. Furthermore, it is also possible to attach a shift lever or the like to a shaft of said type, which shift lever must be guided past obstruction contours within the transmission during assembly, such that only oblique insertion is possible.

According to the invention, the cover part can also be formed from a metal, in particular a light metal such as aluminium.

Overall, the object is thereby solved in its entirety.

Preferred embodiments of the cover-bearing arrangement according to the invention are specified below. Said preferred embodiments can also be realized according to the invention with a cover part which is produced not from plastic but from a metal.

According to a first preferred embodiment of the sleeve section, therefore, the sleeve section has, at its first end section which points away from the flange section, a transversely-running groove into which projects a section which protrudes radially from the shaft, in such a way as to limit the rotational mobility of the shaft.

In this way, the cover part can also realize the function of a rotational stop. The transversely-running groove can extend, for example proceeding from the free end of the first end section, in the axial direction, such that the cover part which has the sleeve section and the flange section can be produced cost-effectively.

Here, it is preferable if the protuding section of the shaft is embodied as a pin which is fixed in a radial bore of the shaft.

In this way, the rotational stop can be realized in a cost-effective manner. Instead of a pin, the shaft can also have a collar for this purpose.

It is also advantageous if the first end section has two grooves into which projects in each case one protruding section.

The pin can for example extend through the radial bore of the shaft in such a way as to protrude beyond the periphery of the shaft at both sides. In this case, the sleeve section can have two such grooves which are situated opposite one another in a corresponding way. Here, the cover part can absorb the forces which occur in the event of abutment against the rotational stop in an effective and distributed manner, such that the cover part need not be of such solid design.

Overall, it is also preferable for a shoulder to be formed in the sleeve section, which shoulder serves as a first axial stop for a bearing in the form of a separate bearing component, with the bearing being inserted into the sleeve section from the side of the first end section, and with the protruding section forming a second, opposite axial stop for the bearing.

In this way, the protruding section can serve both as a rotational stop and also so as to secure the bearing axially.

In general, the bearing which is arranged according to the invention in the sleeve section can also be formed as a plain bearing directly in the cover part, such that no separate bearing component is necessary.

According to a further preferred embodiment, the sleeve section has a plurality of axially running ribs on its outer periphery.

By means of the ribs, the sleeve section can realize a comparatively high level of strength without the wall thicknesses becoming too large. This is advantageous in particular in the case of production in an injection moulding process.

A further preferred embodiment provides that a shaft seal, such as a shaft sealing ring, a quad ring etc., is inserted into the sleeve section from a second end section which is adjacent to the flange section.

In this way, the cover part can also serve for holding a shaft seal.

Here, it is self-evident that a shoulder which is provided on the inner periphery of the sleeve section can serve both as an axial stop for the bearing and also for the shaft seal (from opposite sides). A shoulder of said type is however not strictly necessary.

It is also preferable if the flange section has at least one, preferably two fastening openings into which in each case one metal sleeve is inserted.

In this way, the cover part can be fastened to the housing with relatively high tightening torques. Furthermore, metal sleeves of said type can be easily concomitantly injection-moulded or pressed into a plastic part.

According to a further preferred embodiment, the flange section is of generally polygonal shape (in particular rhombic or triangular) (in plan view), with a radially protruding holding lug being formed on one side edge.

While the rhombic shape can result for example from two fastening openings being arranged on opposite sides of the sleeve section (and therefore of the shaft), the flange section, in the case of a design with a holding lug, can also be used to hold or block other components or to mount said components in some other way.

For example, a holding lug of said type can be used to secure a cable strand which is laid on the outer periphery of the housing such that said cable strand maintains a preferred position.

A further preferred embodiment provides that a peripheral groove is formed on the outer periphery of the sleeve section, into which peripheral groove is inserted a sealing ring such as an O-ring.

In this way, sealing of the cover part in the region of the outer periphery of the latter can be realized in a comparatively simple manner.

Although the cover-bearing arrangement according to the invention can in principle be used on any type of shaft which is inserted into a transmission housing, its use in connection with an actuator shaft is preferable.

The actuator shaft can for example be a parking lock shaft which extends in particular in a direction transversely with respect to the main axis of the transmission. The cover-bearing arrangement can however for example also be used in connection with an actuator shaft in the form of a shift shaft.

It is self-evident that the features specified above and yet to be explained below can be used not only in the combination specified in each case but can also be used in other combinations or individually without departing from the scope of the present invention.

BRIEF DESCRIPTION OF THE SEVERAL VIEWS OF THE DRAWING

Exemplary embodiments of the invention are illustrated in the drawing and are explained in more detail in the following description. In the drawing:

FIG. 1 shows a schematic sectioned view through a cover-bearing arrangement according to the invention for mounting a shaft on a housing of a transmission of a vehicle;

FIG. 2 shows a perspective illustration of an embodiment of a cover part for a cover-bearing arrangement according to the invention;

FIG. 3 shows a side view of the cover part from FIG. 2; and

DETAILED DESCRIPTION OF THE INVENTION

Figure 4:
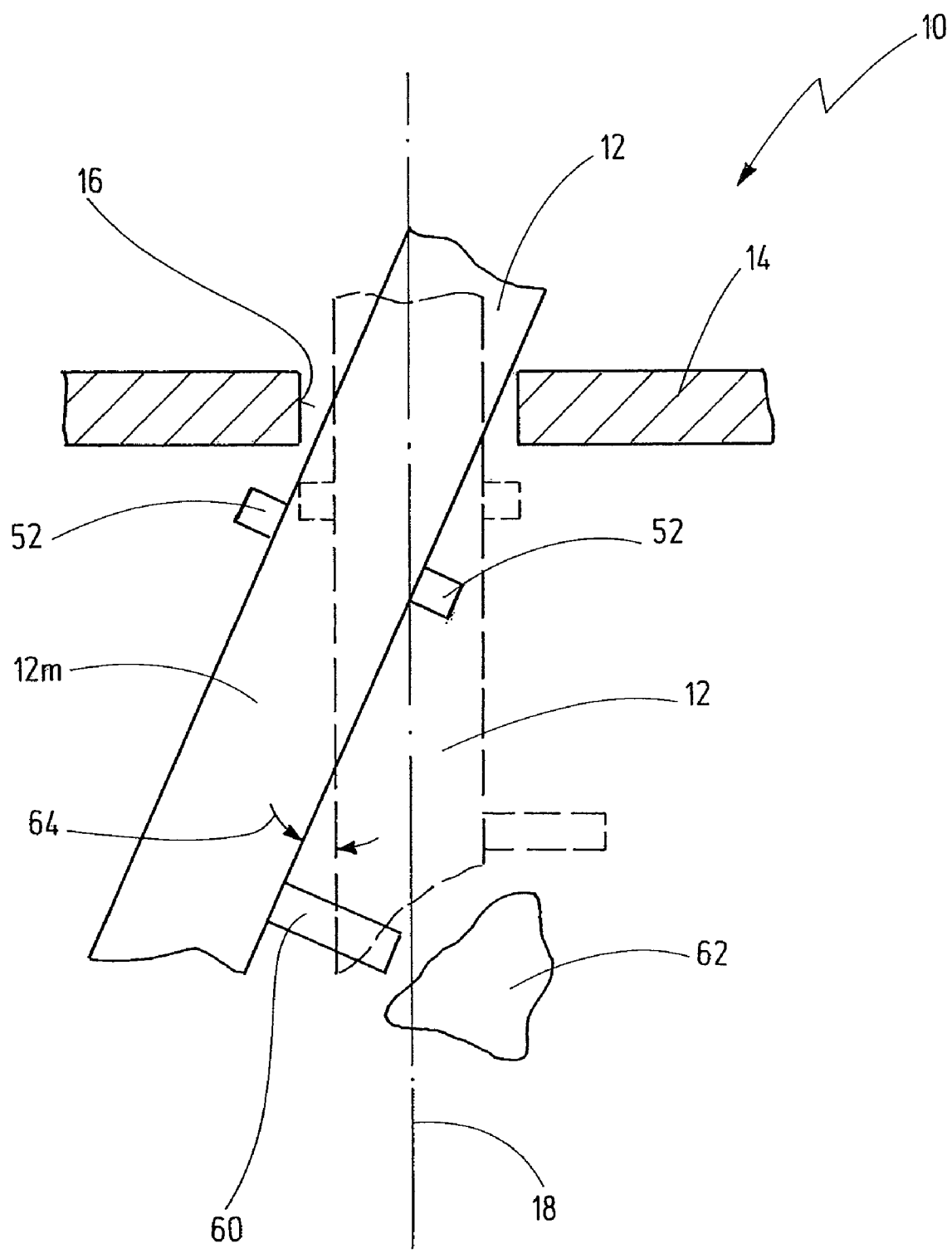
FIG. 4 shows a schematic illustration of assembly steps for mounting an actuator shaft in a transmission housing.

In FIG. 1, a first embodiment of a cover-bearing arrangement according to the invention is denoted generally by 10.

The cover-bearing arrangement 10 serves for mounting a shaft 12 which extends into a housing 14, in the region of a housing opening 16 of the housing 14.

The housing 14 is preferably a transmission housing. The shaft 12 is preferably an actuator shaft such as a parking lock shaft for a vehicle transmission.

An axial alignment of the shaft 12 is denoted in FIG. 1 by 18.

The cover-bearing arrangement 10 has a cover part 20 composed of plastic. The cover part 20 comprises a flange section 22 and a sleeve section 24. Here, the flange section 22 bears at the outside against the housing 14 and fixes the cover part 20 to the housing 14. The sleeve section 24 extends into the housing opening 16. The outer periphery of the sleeve section 24 corresponds to the inner periphery of the housing opening 16. The sleeve section 24 is preferably inserted into the housing opening 16 with a fit.

The sleeve section 24 has a first end section 26 which extends into the interior of the housing 14, and a second end section 28 which, as viewed in the axial direction 18, is formed in the region of the flange section 22.

The sleeve section 24 surrounds the shaft 12 and has, on its inner periphery, a shoulder 30. The shoulder 30 is situated between the first end section 26 and the second end section 28.

A bearing 32 is inserted into the sleeve section 24 from the direction of the first end section 26. The bearing 32 can be a rolling bearing or a plain bearing. The shoulder 30 serves as an axial stop for the bearing 32.

A shaft seal 34 is inserted into the sleeve section 24 from the direction of the second end section 28. The shaft seal 34 seals off the outer periphery of the shaft 12. The shoulder 30 also serves as an axial stop for the shaft seal 34.

Formed on the outer periphery of the sleeve section 24 is a peripheral groove 38 into which is inserted an O-ring 36. The O-ring 36 seals off the outer periphery of the sleeve section 24 with respect to the housing opening 16. With the O-ring 36 and the shaft seal 34, it is possible to realize a fluid-tight closure of the housing 14 in the region of the housing opening 16 by means of the cover-bearing arrangement 10.

Formed on the outer periphery of the sleeve section 24 is a plurality of axial ribs 40, as can be seen in particular in FIGS. 2 and 3.

It can also be seen in FIG. 2 that the flange section 22 has two fastening openings 42 whose axes are preferably aligned parallel to the axial direction 18. In each case one metal sleeve 44 is inserted, in particular injection-moulded, into the fastening openings 42. Indicated in FIG. 1 are screws 46, by means of which the flange section 22 can be fixed from the outside to the housing 14. Corresponding threaded holes in the housing 14 are denoted in FIG. 1 by 47.

The housing 14 can be part of a transmission 48, in particular of a vehicle transmission, such as a manual or automated shift transmission or dual-clutch transmission.

The sleeve section also has, on its first end section 26, a radial groove 50 which extends through opposite wall sections of the sleeve section 24. The radial groove 50 is thus formed in principle by two grooves in the opposing wall sections. This can also be seen in more detail in FIGS. 2 and 3.

Secondly, the shaft 12 has a radial pin 52 which is fixed in a radial bore (not indicated in any more detail) in the shaft 12. The radial pin 52 extends, as can also be seen in FIG. 4, out of the shaft 12 at both sides. In each case one pin section therefore engages into an associated groove in the in each case opposite wall region of the sleeve section 24. The grooves 50 extend in each case in the peripheral direction over an angle range which is generally greater than the diameter of the radial pin 52. Accordingly, the shaft 12 can be rotated to a limited extent in relation to the cover part 20, for example by an angle in the range from 5 to 45°. Said limited rotational mobility of the shaft 12 can, in the case of use as an actuator shaft, serve to perform positioning movements in the rotational direction. The cover part 20 serves here as a rotational stop which can be provided in addition to a rotational stop provided in an associated actuator arrangement.

Furthermore, the radial pin 52, as can be seen in particular in FIG. 1, serves in the installed state to axially secure the bearing 32, such that the bearing 32 is fixed in a secured manner between the shoulder 30 and the radial pin 52.

The flange section 22 is provided, like the sleeve section 24, with a plurality of ribs which extend for example between the sleeve section 24 and the fastening openings 42.

Furthermore, it can be seen in particular in FIG. 2 that the flange section 22 is approximately rhombic in shape in plan view. Here, a holding lug 56 is provided in the region of a side edge 58, which is schematically indicated in FIG. 2, of said rhombus, which holding lug 56 extends outward with respect to the side edge 58. Said holding lug 56 can serve for example for mounting lines, cables etc. which are laid at the outside on the housing 14.

FIG. 4 shows how an actuator shaft 12 can be mounted, according to the invention, in a transmission housing 14.

The actuator shaft 12 has a cross section which is considerably smaller than a housing opening 16 through which the shaft 12 is to be guided.

Furthermore, a shift lever 60 or the like is fixed to the shaft 12 in the region of a lower end, which shift lever 60 extends transversely with respect to the longitudinal extent of the shaft 12.

FIG. 4 also schematically illustrates an obstruction contour 62 which is formed in the transmission housing 14, which indicates that the shaft 12 cannot be mounted in the axial direction 18 from within the housing 14.

Accordingly, the housing opening 16 is designed such that the shaft 12 can be inserted at an angle 64 of greater than zero (for example 5 to 30°) into the housing opening 16, in order to thereby for example guide the shift lever 60 past the obstruction contour 62. This is shown in FIG. 4 by the solid lines of the shaft 12m.

After the insertion of the shaft 12 into the housing opening 16, it is possible for a pre-assembled cover-bearing arrangement 10 (for example including the cover part 20, the bearing 32, the shaft seal 34 and the O-ring 36) to be placed onto the free end of the shaft 12 from the outside of the housing 14.

The shaft 12 is subsequently aligned in the axial direction 18, as illustrated in FIG. 4 by dashed lines. The cover-bearing arrangement 10 (not shown in FIG. 4 for a clearer illustration) is then fixed to the housing 14 by virtue of the sleeve section 24 being inserted into the housing opening 16 and the flange section 22 being fastened to the housing 14.

What is claimed is:

1. Cover-bearing arrangement for mounting a shaft which extends into a housing in the region of a housing opening and for closing off the housing in the region of the housing opening, having a sleeve section which surrounds the shaft and which can be inserted into the housing opening, and having a flange section which can he fastened to the housing, with a bearing for rotatably mounting the shaft being arranged in the sleeve section, wherein the sleeve section and the flange section are produced as a single-piece component from plastic, wherein the sleeve section has, at its first end section which points away from the flange section, a radial groove into which projects a pin which protrudes radially from the shaft, in such a way as to limit the rotational mobility of the shaft.

2. Cover-bearing arrangement according to claim 1, wherein the protruding section is embodied as a pin which is fixed in a radial bore of the shaft.

3. Cover-bearing arrangement according to claim 1, wherein the first end section has two grooves into which projects in each case one protruding section.

4. Cover-bearing arrangement according to claim 1 wherein a shoulder is formed in the sleeve section, which shoulder serves as a first axial stop for a bearing which is inserted into the sleeve section from the side of the first end section, with the protruding section forming a second, opposite axial stop for the bearing.

5. Cover-bearing arrangement according to claim 1, wherein the sleeve section has a plurality of axially running ribs on its outer periphery.

6. Cover-bearing arrangement according to claim 1, wherein a shaft seal is inserted into the sleeve section from a second end section which is adjacent to the flange section.

7. Cover-bearing arrangement according to claim 1, wherein the flange section has at least one fastening opening into which a metal sleeve is inserted.

8. Cover-hearing arrangement according to claim 1, wherein the flange section is of generally rhombic shape, with a radially protruding holding lug being formed on one side edge.

9. Cover-bearing arrangement according to claim 1, wherein a peripheral groove is formed on the outer periphery of the sleeve section, into which peripheral groove is inserted a sealing ring.

10. Cover-bearing arrangement for mounting a shaft which extends into a housing in the region of a housing opening and for closing off the housing in the region of the housing opening, having a sleeve section which surrounds the shaft and which can be inserted into the housing opening, and having a flange section which can be fastened to the housing, with a bearing for rotatably mounting the shaft being arranged in the sleeve section, wherein the sleeve section and the flange section are produced as a single-piece component, wherein the sleeve section has, at its first end section which points away from the flange section, a radial groove into which projects a pin which protrudes radially from the shaft, in such a way as to limit the rotational mobility of the shaft.

11. Cover-bearing arrangement according to claim 10, wherein a shoulder is formed in the sleeve section, which shoulder serves as a first axial stop for a bearing is inserted into the sleeve section from the side of the first end section, with the protruding section forming a second, opposite axial stop for the bearing.

12. Vehicle transmission having a housing and having an actuator shaft which extends through a housing opening into the housing, wherein the actuator shaft is mounted in the region of the housing opening by means of a cover-bearing arrangement for mounting a shaft which extends into a housing in the region of a housing opening and for closing off the housing in the region of the housing opening, having a sleeve section which surrounds the shaft and which can be inserted into the housing opening, and having a flange section which can be fastened to the housing, with a bearing for rotatably mounting the shaft being arranged in the sleeve section, wherein the sleeve section and the flange section are produced as a single-piece component from plastic, wherein the sleeve section has, at its first end section which points away from the flange section, a radial groove into which projects a pin which protrudes radially from the shaft, in such a way as to limit the rotational mobility of the shaft.

13. Vehicle transmission according to claim 12, wherein the actuator shaft is a parking lock shaft.

14. Method for mounting an actuator shaft in a transmission housing, having the steps:
   providing the actuator shaft, which is to be mounted from within the transmission housing, by virtue of one end of the shaft being guided from the inside through a housing opening, with a cross section of the housing opening being greater than a cross section of the shaft, and with the shaft end being inserted obliquely into the housing opening at an angle of greater than zero;
   mounting a cover-bearing arrangement on the shaft end, specifically outside the transmission housing;
   aligning the shaft with an axis of the housing opening and inserting a sleeve section of the cover-bearing arrangement into the housing opening;
   fixing the cover-bearing arrangement to the housing in such a way that the shaft end is rotatably mounted in the cover-bearing arrangement and the housing opening is sealed off; and
   mounting the shaft end in the cover-bearing arrangement so as to limit the rotational mobility of the shaft, wherein a radially-protruding pin engages into a radial groove in the sleeve section at an end section of the sleeve section which points away from the flange section.

15. Method according to claim 14, wherein the cover-bearing arrangement is a cover-bearing arrangement for mounting a shaft which extends into a housing in the region of a housing opening and for closing off the housing in the region of the housing opening, having a sleeve section which surrounds the shaft and which can be inserted into the housing opening, and having a flange section which can be fastened to the housing, with a bearing for rotatably mounting the shaft being arranged in the sleeve section, wherein the sleeve section and the flange section are produced as a single-piece component from plastic.

\* \* \* \* \*